US012300884B2

(12) United States Patent
Cho et al.

(10) Patent No.: US 12,300,884 B2
(45) Date of Patent: May 13, 2025

(54) PARALLELLY AND DIAGONALLY PLACED MEANDER-LINE SLOT RESONATORS FOR MUTUAL COUPLING REDUCTION

(71) Applicant: University of Florida Research Foundation, Inc., Gainesville, FL (US)

(72) Inventors: Hyunho Cho, Gainesville, FL (US); Yong Kyu Yoon, Gainesville, FL (US)

(73) Assignee: UNIVERSITY OF FLORIDA RESEARCH FOUNDATION, INC., Gainesville, FL (US)

(*) Notice: Subject to any disclaimer, the term of this patent is extended or adjusted under 35 U.S.C. 154(b) by 285 days.

(21) Appl. No.: 17/727,367

(22) Filed: Apr. 22, 2022

(65) Prior Publication Data

US 2022/0344806 A1 Oct. 27, 2022

Related U.S. Application Data

(60) Provisional application No. 63/179,687, filed on Apr. 26, 2021.

(51) Int. Cl.

| | |
|---|---|
| ***H01Q 1/52*** | (2006.01) |
| ***H01Q 21/06*** | (2006.01) |
| ***H04K 3/00*** | (2006.01) |

(52) U.S. Cl.

CPC ........... *H01Q 1/523* (2013.01); *H01Q 21/065* (2013.01); *H04K 3/20* (2013.01); *H04K 2203/32* (2013.01)

(58) Field of Classification Search

CPC ..... H01Q 1/52; H01Q 21/065; H04K 2203/32

See application file for complete search history.

(56) References Cited

U.S. PATENT DOCUMENTS

| | | | | |
|---|---|---|---|---|
| 10,224,629 B2 * | 3/2019 | West | .................... | H01Q 3/2682 |
| 2001/0048394 A1 | 12/2001 | Apostolos et al. | | |
| 2006/0189273 A1 * | 8/2006 | Buer | .................... | H01Q 3/2658 455/12.1 |

(Continued)

OTHER PUBLICATIONS

Pandhare et al., Miniaturized microstrip antenna array using defected ground structure with enhanced performance, Sep. 2016, Engineering Science and Technology, an International Journal, 1360-1367 (Year: 2016).*

(Continued)

*Primary Examiner* — Graham P Smith
*Assistant Examiner* — Austin M Back
(74) *Attorney, Agent, or Firm* — Thomas | Horstemeyer, LLP

(57) ABSTRACT

Various examples are provided related to mutual coupling reduction between elements in antenna arrays. In one example, an antenna array includes patch antenna elements disposed on a first side of a substrate; and meander line (ML) slots formed in a ground plane disposed on a second side of the substrate. The ML slots can be disposed opposite a corresponding patch antenna element with the ML slot extending at an angle between first and second sides defining a corner that is adjacent to another patch antenna element. In another example, an antenna array includes first and second patch antenna elements disposed on a first side of a substrate and separated by a gap; and at least one meander line (ML) slots formed in a ground plane disposed on a second side of the substrate and aligned with the gap between the first and second patch antenna elements.

20 Claims, 18 Drawing Sheets

(56) References Cited

U.S. PATENT DOCUMENTS

| | | | | |
|---|---|---|---|---|
| 2008/0204347 | A1 | 8/2008 | Alvey et al. | |
| 2009/0128446 | A1 | 5/2009 | Gummalla et al. | |
| 2010/0238079 | A1 | 9/2010 | Ayatollahi et al. | |
| 2011/0273353 | A1 | 11/2011 | Achour et al. | |
| 2017/0237469 | A1* | 8/2017 | Taghivand | H04B 5/79 455/41.1 |
| 2018/0315880 | A1* | 11/2018 | Jadidi | G01N 21/3581 |
| 2019/0334235 | A1* | 10/2019 | Yoon | H01Q 21/06 |

OTHER PUBLICATIONS

Ismaiel et al., A meander shaped defected ground structure (DGS) for reduction of mutual coupling between microstrip antennas, Apr. 28-30, 2014, IEEE Xplore (Year: 2014).*

Rahman MM, Islam MS, Wong HY, Alam T, Islam MT. Performance Analysis of a Defected Ground-Structured Antenna Loaded with Stub-Slot for 5G Communication. Sensors. 2019; 19(11):2634. https://doi.org/10.3390/s19112634 (Year: 2019).*

Gupta S, Patil S, Dalela C, Kanaujia BK. Analysis and design of inclined fractal defected ground-based circularly polarized antenna for CA-band applications. International Journal of Microwave and Wireless Technologies. 2021;13(4):397-406. doi: 10.1017/S1759078720001142 (Year: 2021).*

2014 31st National Radio Science Conference (NRSC), Cairo, Egypt, 2014, pp. 21-26, doi: 10.1109/NRSC.2014.6835056 (Year: 2014).*

Engineering Science and Technology International Journal, vol. 19, Issue 3, 2016, pp. 1360-1367 (Year: 2016).*

International Search Report for PCT/US17/37724 mailed Sep. 6, 2017.

Habashi et al. "Mutual Coupling Reduction Between Very Closely Spaced Patch Antennas Using Low-Profile Folded Split-Ring Resonators (FSRRs)". IEEE Antennas and Wireless Propagation Letters, vol. 10, 2011 pp. 862-865.

Yang et al. "Microstrip Antennas Integrated With Electromagnetic Band-Gap (EBG) Structures: A Low Mutual Coupling Design for Array Applications" IEEE Transactions on Antennas and Propagation, vol. 51, No. 10 (Oct. 2003) pp. 2936-2946.

Bait-Suwailam et al. "Mutual Coupling Reduction Between Microstrip Patch Antennas Using Slotted-Complementary Split-Ring Resonators" IEEE Antennas and Wireless Propagation Letters, vol. 9, 2010 pp. 876-878.

* cited by examiner

TABLE I. COMPARISON OF INSERTION LOSS BY THE DISTANCE

| | Distance between Patches | | | |
|---|---|---|---|---|
| | *15 mm* | *10 mm* | *5 mm* | *2 mm* |
| Resonant frequency | 4.96 GHz | 4.96 GHz | 5.01 GHz | 5.11 GHz |
| S21(dB) | 20.58 | 18.73 | 15.23 | 15.30 |
| S31(dB) | 20.58 | 18.69 | 15.24 | 15.63 |
| S41(dB) | 21.20 | 18.02 | 11.49 | **5.32** |
| S32(dB) | 21.16 | 17.97 | 11.50 | **5.33** |
| S42(dB) | 20.57 | 18.67 | 15.25 | 15.59 |
| S43(dB) | 20.67 | 18.71 | 15.25 | 15.29 |

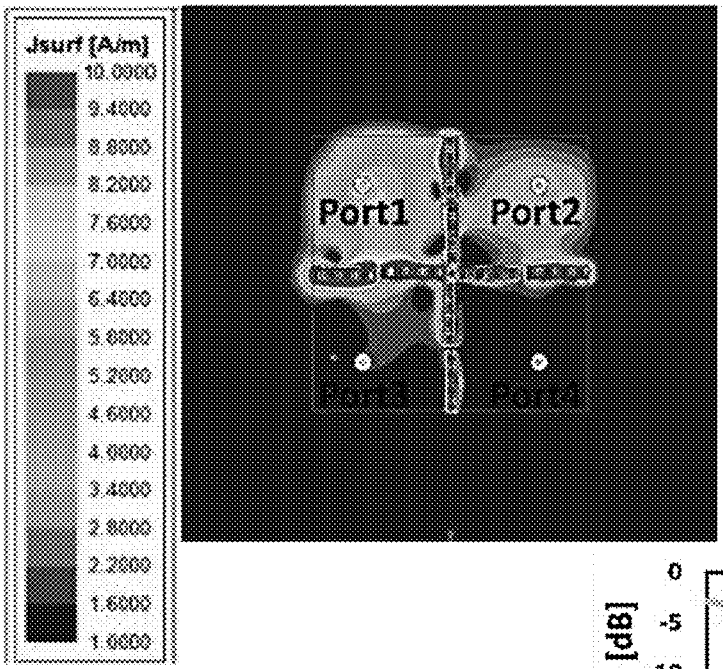
FIG. 7A
FIG. 7B
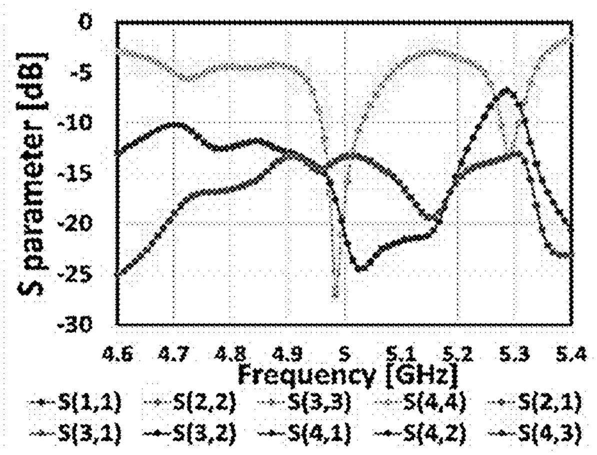
TABLE II. COMPARISON OF SIMULATED S PARAMETERS
| | **Design (1)** | | **Design (2)** | |
|---|---|---|---|---|
| | *W/O ML* | *With ML* | *W/O ML* | *With ML* |
| Resonant frequency | 5.11GHz | 4.98GHz | 3.49GHz | 3.55GHz |
| S11(dB) | 35.1 | 26.46 | 33.15 | 42.98 |
| S22(dB) | 32.71 | 26.78 | 32.13 | 46.16 |
| S33(dB) | 33.63 | 26.99 | 31.97 | 53.54 |
| S44(dB) | 33.17 | 26.6 | 32.64 | 53.88 |
| S21(dB) | 15.30 | 13.75 | 14.93 | **22.92** |
| S31(dB) | 15.63 | 13.8 | 14.86 | **22.92** |
| S41(dB) | 5.32 | **17.54** | 8.23 | **20.62** |
| S32(dB) | 5.33 | **17.59** | 8.22 | **20.71** |
| S42(dB) | 15.59 | 13.76 | 14.89 | **22.85** |
| S43(dB) | 15.29 | 13.71 | 14.93 | **22.97** |
FIG. 8

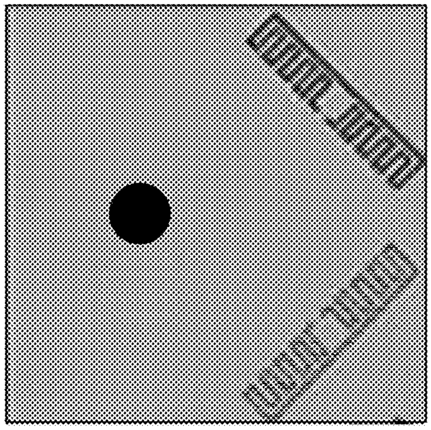
FIG. 9D
FIG. 10B
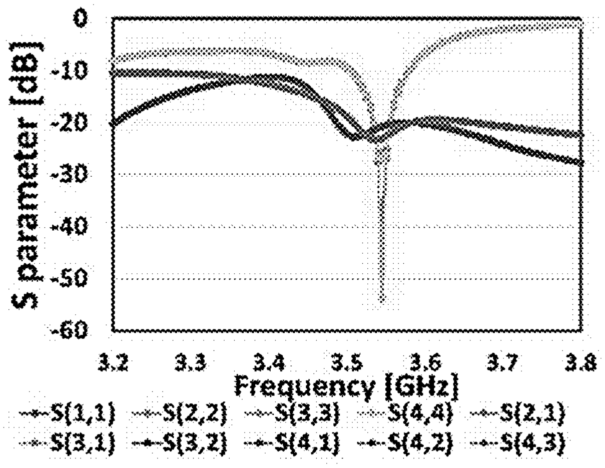
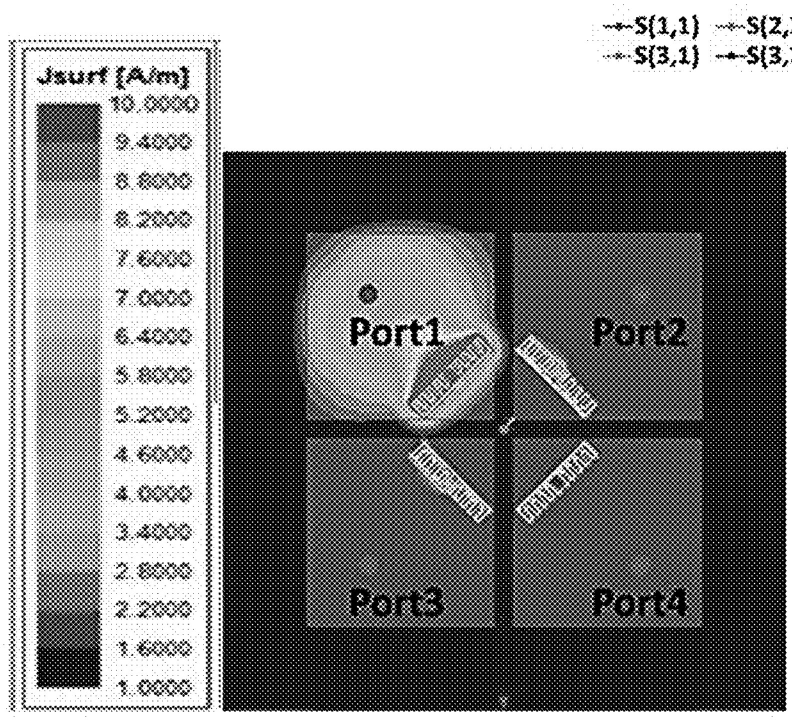
FIG. 10A

TABLE III. COMPARISON OF RADIATION EFFICIENCY AND PEAK GAIN
| | Substrate | ML slots | Radiation Efficiency | Peak Gain |
|---|---|---|---|---|
| Design (1) | FR-4 | Without | 66 % | 1.85 dB |
| | | With | 53 % | 1.52 dB |
| | Rogers4350B | Without | 95 % | 2.77 dB |
| | | With | 86 % | 2.64 dB |
| Design (2) | FR-4 | Without | 44 % | 0.83 dB |
| | | With | 25 % | 0.50 dB |
| | Rogers4350B | Without | 93 % | 2.92 dB |
| | | with | 80 % | 2.54 dB |
FIG. 13
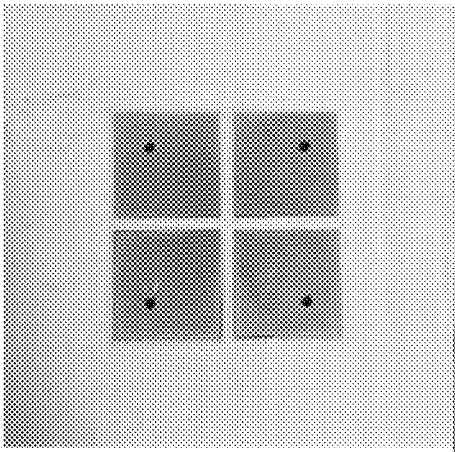
FIG. 14A
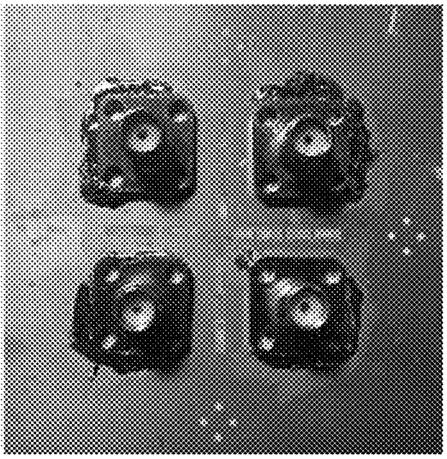
FIG. 14B
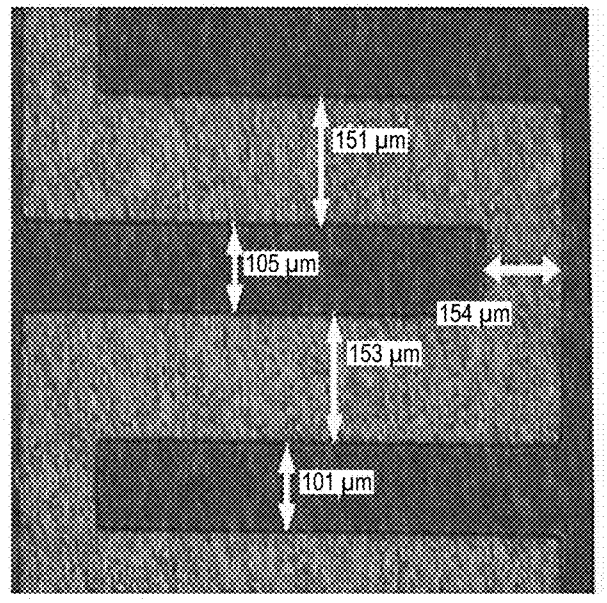
FIG. 14C

TABLE IV. COMPARISON OF MEASURED S PARAMETERS

| | Design (1) | | Design (2) | |
|---|---|---|---|---|
| | *W/O ML* | *With ML* | *W/O ML* | *With ML* |
| Resonant frequency | 4.9GHz | 5.12 – 5.22GHz | 3.54GHz | 3.59GHz |
| S11(dB) | 24.58 | 19.3 | 29.37 | 36.48 |
| S22(dB) | 24.54 | 35.69 | 23.12 | 41.09 |
| S33(dB) | 30.73 | 22.43 | 28.89 | 32.81 |
| S44(dB) | 40.84 | 30.57 | 29.02 | 43.01 |
| S21(dB) | 16.54 | 10.69 | 13.69 | **23.24** |
| S31(dB) | 8.95 | 11.83 | 13.51 | **22.87** |
| S41(dB) | 5.42 | **13.46** | 7.75 | **19.45** |
| S32(dB) | 8.03 | **18.84** | 7.87 | **19.02** |
| S42(dB) | 8.98 | 9.91 | 14.21 | **23.23** |
| S43(dB) | 10.44 | 12.43 | 13.38 | **22.75** |

FIG. 18

TABLE V. COMPARISON OF THE CHARACTERISTICS OF OTHER STATE-OF-ART ANTENNAS

| Paper | Resonant freq. | Array type | Edge-to-Edge distance | Isolation Improvement | Antenna Size | Resonant frequency mismatching |
|---|---|---|---|---|---|---|
| [7] | 5.2GHz | 2x1 | 2.2mm (0.039 $\lambda_0$) | 30dB | 50mm x 68mm (0.87 $\lambda_0$ x 1.18 $\lambda_0$) | Mismatched |
| [8] | 5.64GHz | 4x1 | 25mm (0.47 $\lambda_0$) | 0.6 - 20dB | 130mm x 60mm (2.4 $\lambda_0$ x 1.2 $\lambda_0$) | Not reported |
| [9] | 2.45GHz | 2x2 | 11.36mm (0.093 $\lambda_0$) | 9.8 – 20dB (SIM.) | 111.7mm x 111.7mm (0.91 $\lambda_0$ x 0.91 $\lambda_0$) | Mismatched |
| Design (1) | 4.98GHz | 2 x 2 | 2mm (0.033 $\lambda_0$) | Partially improved | 63mm x 63mm (0.96 $\lambda_0$ x 0.96 $\lambda_0$) | Matched (SIM.) Mismatched (Meas.) |
| Design (2) | 3.545GHz | 2 x 2 | 2mm (0.023 $\lambda_0$) | 9dB + | 60mm x 60mm (0.7 $\lambda_0$ x 0.7$\lambda_0$) | Matched (SIM.) Matched (Meas.) |

FIG. 19

Table 1. Dimensional parameters of the resonators and patches

| Parameter | Value(mm) | Parameter | Value(mm) |
|---|---|---|---|
| $l_1$ | 40 | $a$ | 0.16 |
| $w_1$ | 40 | $b$ | 0.2 |
| $l_2$ | 14 | $c$ | 0.16 |
| $w_2$ | 14 | $d$ | 2 |
| $l_3$ | 7.06 | $f$ | 2.4 |
| $w_3$ | 1.39 | $g$ | 0.36 |

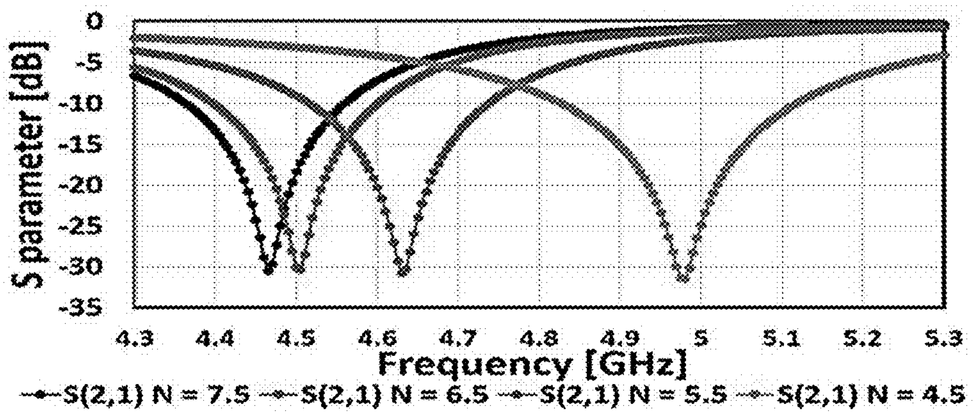
FIG. 22
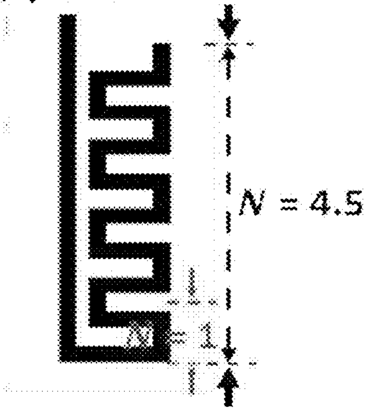
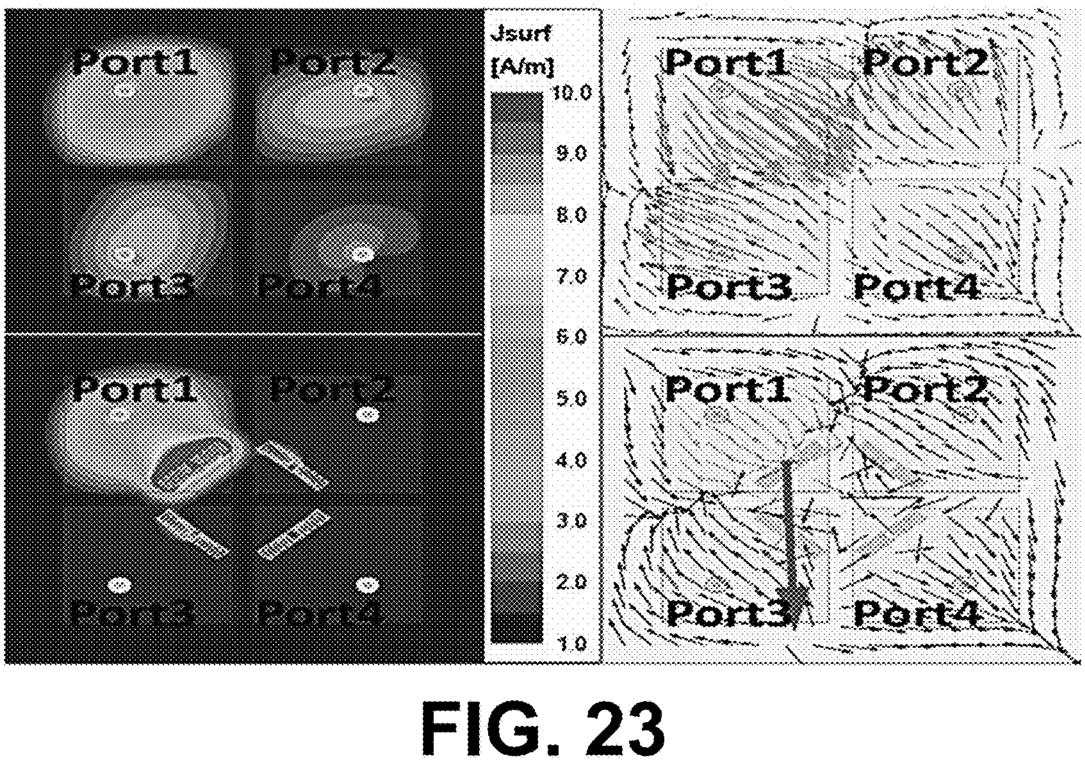
FIG. 23

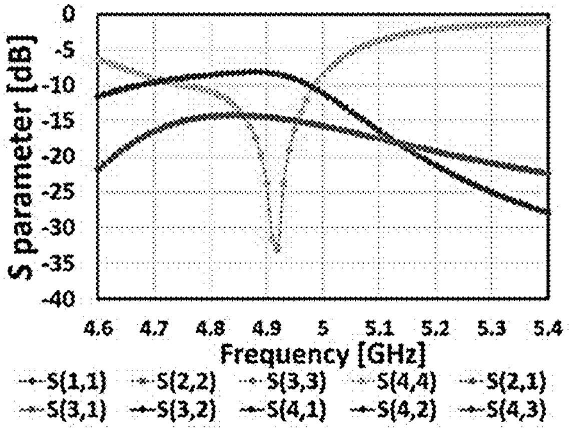
FIG. 24A
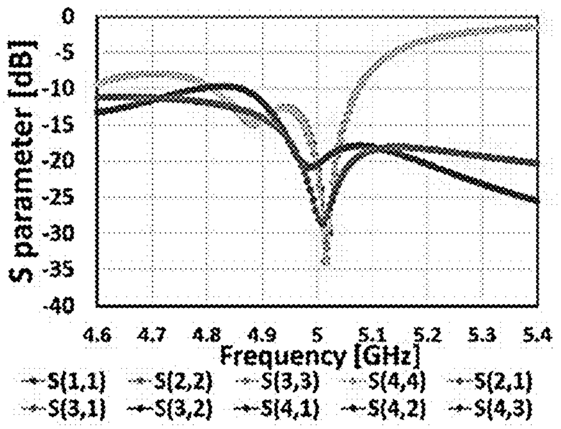
FIG. 24B
Table 2. Comparison of simulated S parameter.
| | Without ML | With ML | Improvement |
|---|---|---|---|
| Resonant frequency | 4.92GHz | 5.02GHz | N/A |
| S11(dB) | 32.94 | 32.06 | -0.88 |
| S22(dB) | 32.49 | 33.47 | 0.98 |
| S33(dB) | 33.03 | 34.04 | 1.01 |
| S44(dB) | 32.77 | 33.78 | 1.01 |
| S21(dB) | 14.56 | 27.82 | 13.26 |
| S31(dB) | 14.58 | 27.36 | 12.78 |
| S41(dB) | 8.35 | 19.54 | 11.19 |
| S32(dB) | 8.35 | 19.46 | 11.11 |
| S42(dB) | 14.58 | 27.62 | 13.04 |
| S43(dB) | 14.59 | 27.18 | 12.59 |
FIG. 24C Table 3 Classification of case 1 - 4
| | Port1 | | Port2 | | Port3 | | Port4 | |
|---|---|---|---|---|---|---|---|---|
| Case1 | 1V | 0° | 0V | 0° | 0V | 0° | 0V | 0° |
| Case2 | 1V | 0° | 1V | 0° | 1V | 0° | 1V | 0° |
| Case3 | 1V | 90° | 1V | 180° | 1V | 180° | 1V | 0° |
| Case4 | 2V | 90° | 1V | 180° | 1V | 180° | 0.5V | 0° |
FIG. 25E
Table 4. Comparison of antenna performance
| | Peak Directivity | Peak Gain | Radiation Efficiency | Front-Back-Ratio |
|---|---|---|---|---|
| Case1 | 3.17 | 0.78 | 0.246 | 1.91 |
| Case2 | 1.83 | 0.51 | 0.277 | 1.28 |
| Case3 | 3.78 | 0.91 | 0.24 | 17.66 |
| Case4 | 4.93 | 1.22 | 0.25 | 8.92 |
FIG. 25F
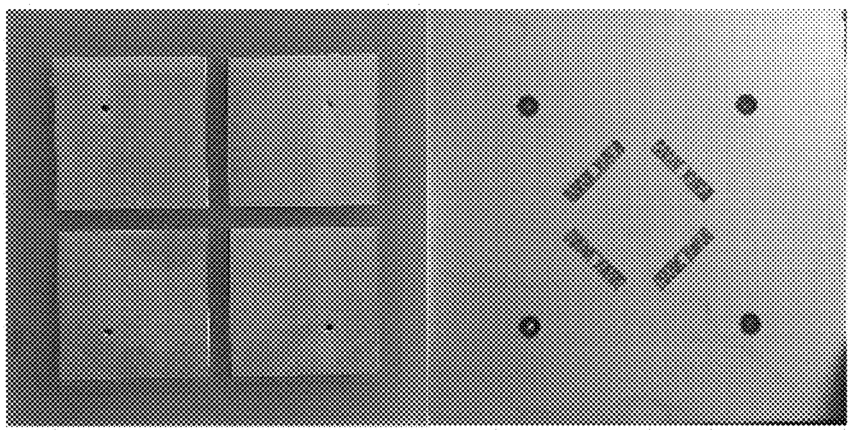
FIG. 26A FIG. 26B
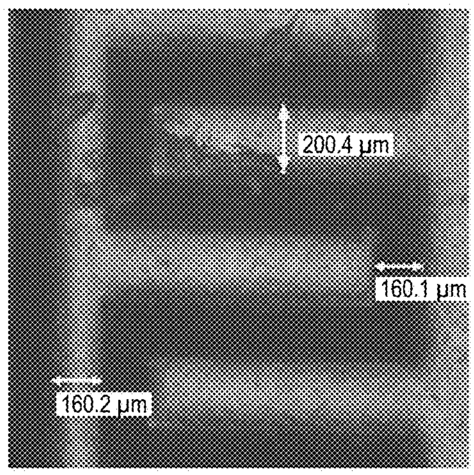
FIG. 26C Table 5. Comparison of the measured S parameter

| | Without ML | With ML | Improvement |
|---|---|---|---|
| Resonant frequency | 4.93GHz | 5.02GHz | N/A |
| S11(dB) | 35.18 | 31.42 | -3.76 |
| S22(dB) | 25.48 | 35.46 | 9.98 |
| S33(dB) | 32.32 | 25.62 | -6.7 |
| S44(dB) | 31.66 | 25.14 | -6.52 |
| S21(dB) | 17.32 | 24.66 | 7.34 |
| S31(dB) | 17.97 | 28.68 | 10.71 |
| S41(dB) | 7.02 | 17.45 | 10.43 |
| S32(dB) | 7.02 | 17.48 | 10.46 |
| S42(dB) | 17.59 | 27.74 | 10.15 |
| S43(dB) | 18.06 | 29.14 | 11.08 |

FIG. 28C

Table 6. Comparison of the proposed antenna to other state-of-the-art antennas

| Year | Separation | Improv. | Antenna Size | RF. shift |
|---|---|---|---|---|
| 2018[2] | $0.99\lambda_0$ | 8.7dB | $3.78\lambda_0 \times 4.1\lambda_0$ | NR |
| 2018[3] | $0.32\lambda_0$ | NR | $1.42\lambda_0 \times 1.42\lambda_0$ | Shifted |
| 2019[4] | $0.62\lambda_0$ | 9.5dB | $2.5\lambda_0 \times 2.5\lambda_0$ | Shifted |
| This work | $0.033\lambda_0$ | 7.3 – 11.1dB | $0.67\lambda_0 \times 0.67\lambda_0$ | Matched |

FIG. 29

PARALLELLY AND DIAGONALLY PLACED MEANDER-LINE SLOT RESONATORS FOR MUTUAL COUPLING REDUCTION

CROSS REFERENCE TO RELATED APPLICATIONS

This application claims priority to, and the benefit of, co-pending U.S. provisional application entitled "Parallelly and diagonally placed meander-line slot resonators for mutual coupling reduction" having Ser. No. 63/179,687, filed Apr. 26, 2021, which is hereby incorporated by reference in its entirety. This application is related to U.S. non-provisional application having Ser. No. 16/310,294, filed Dec. 14, 2018, now issued as U.S. Pat. No. 11,005,174 on May 11, 2021, which is hereby incorporated by reference in its entirety.

BACKGROUND

Multiple-input and multiple-output (MIMO) antenna systems have been drawing great attention for a hardware security feature such as an anti-jamming signal function and high electromagnetic interference (EMI) immunity for both defense systems (e.g. anti-jamming radars and satellite communications) and civilian applications (e.g. IoT drones and unmanned vehicles). Drones usually employ a single patch antenna for global positioning system (GPS) communications while such a single patch is highly susceptible to intentional or unintentional external interference. For example, GPS is vulnerable to EMI as the system frequency is close to other bands such as ones for TCAS (Traffic Alert Collison & Avoidance System) and IFF (Identification Friend or Foe). Although sufficiently separated frequency bands are used to reduce EMI, it has become difficult to exclude EMI only with the frequency separation as multiple communication equipment is placed in the near proximity of drones.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 7A and 7B illustrate an example of the current distribution and S parameters of the patch array antenna of FIG. 6A, in accordance with various embodiments of the present disclosure.

FIG. 8 is a table illustrating a comparison of simulated S parameters, in accordance with various embodiments of the present disclosure.

FIG. 9D illustrates an example of a patch antenna element with two diagonally placed ML slots, in accordance with various embodiments of the present disclosure.

FIGS. 10A and 10B illustrate an example of the current distribution and S parameters of the patch array of FIG. 19, in accordance with various embodiments of the present disclosure.

FIG. 13 is a table illustrating a comparison of radiation efficiency and peak gain, in accordance with various embodiments of the present disclosure.

FIGS. 14A-14C and 15A-15C are images illustrating examples of fabricated 2×2 patch array antennas with ML slots inserted between the patch elements and with diagonally placed ML slots, in accordance with various embodiments of the present disclosure.

FIG. 18 is a table illustrating a comparison of measured parameters, in accordance with various embodiments of the present disclosure.

FIG. 19 is a table illustrating a comparison of antenna characteristics, in accordance with various embodiments of the present disclosure.

FIG. 22 illustrates an example of simulated insertion loss (S21) of the ML slot according to the number of folded ML slots, in accordance with various embodiments of the present disclosure.

FIG. 23 illustrates examples of current distribution and current flow without ML slots and with ML slots, in accordance with various embodiments of the present disclosure.

FIGS. 24A and 24B illustrate examples of simulate return loss and insertion loss of the 2×2 patch array without ML slots and with ML slots, in accordance with various embodiments of the present disclosure.

FIG. 24C is a table illustrating a comparison of simulates S parameters, in accordance with various embodiments of the present disclosure.

FIGS. 25E and 25F are tables illustrating classification of the four cases and comparison of antenna performance, in accordance with various embodiments of the present disclosure.

FIGS. 26A-26C are images illustrating an example of a fabricated 2×2 patch array antenna with diagonally placed ML slots, in accordance with various embodiments of the present disclosure.

FIG. 28C is a table illustrating a comparison of measured S parameters, in accordance with various embodiments of the present disclosure.

FIG. 29 is a table illustrating a comparison of antenna characteristics, in accordance with various embodiments of the present disclosure.

DETAILED DESCRIPTION

Figure 1:
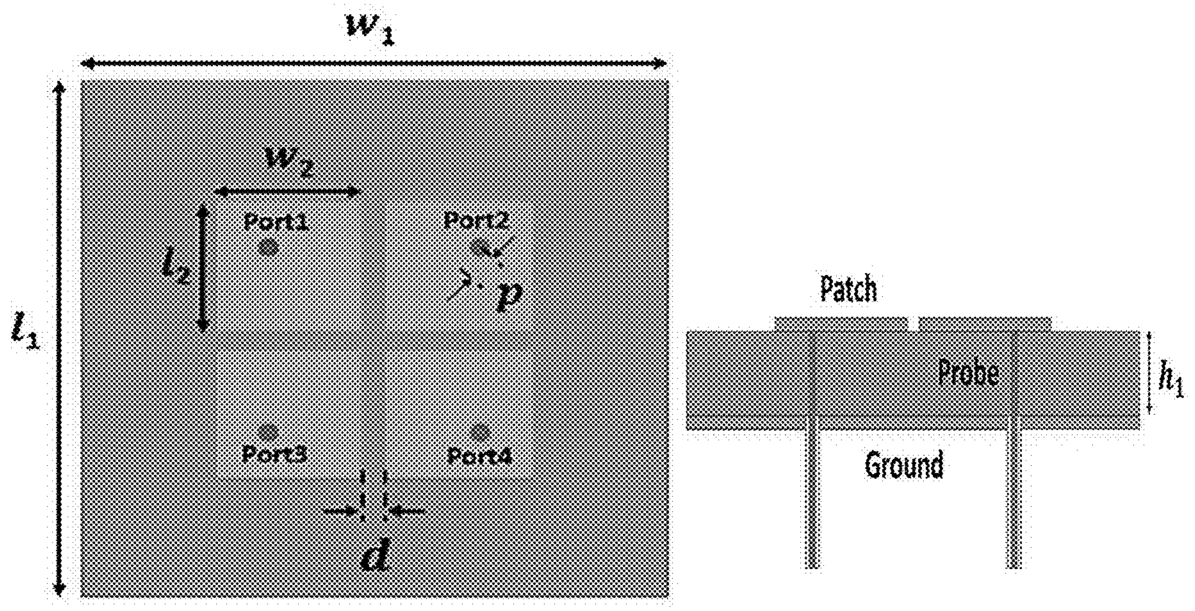
FIG. 1 illustrates an example of a 2×2 patch array antenna, in accordance with various embodiments of the present disclosure.

Disclosed herein are various embodiments related to mutual coupling reduction between elements in antenna arrays. A unique decoupling architecture to suppress mutual coupling in an antenna array is disclosed. Narrow and long meander-line (ML) slot resonators are placed between and underneath the patch antenna elements and etched from the ground plane, enabling further reduction in the gap between array elements while the mutual coupling between array elements is greatly suppressed and antenna radiation performance is preserved.

Usually, an array occupies a larger footprint, which negatively impacts small portable and mobile applications. The size of an array antenna is mainly dictated by the distance between the elements. Generally, the elements are separated by a gap width of a half-wavelength or more (>λ/2), by which the mutual coupling between array elements is mitigated. However, the new decoupling structure can reduce the antenna size to an area much smaller than a conventional antenna design and has the advantage of simple fabrication for mass production. The dimension of the ML slot unit cell can be optimized to operate as a band-stop filter at the target frequency.

The size of the array antenna can be greatly reduced by shrinking the gap between array elements to, e.g., 2 mm (i.e. 0.033λ for 5 GHz and 0.023λ for 3.5 GHz) by inserting the meander-line (ML) ring resonators. Compared with a conventional 2×2 array antenna module, the demonstrated 2×2 array with the meander-line slots provided a 65% area reduction. Furthermore, the mutual coupling between every array element was effectively suppressed by adding diagonally placed meander-line (ML) ring resonators under each element without degrading antenna gain and directivity performance.

Introduction

An antenna array has advantages of high directivity, gain, and anti-jamming capability compared with a conventional single patch antenna. Multiple researches and studies on array antennas have been done for radar and military applications. As the larger number of antenna elements is used, the radiation beam pattern can be controlled better, resulting in improved electromagnetic interference (EMI) immunity. As there exists mutual coupling between array elements, the distance between the neighboring antenna elements is typically designed to be larger than $0.5\lambda_0$, which lets the array antenna be large. Often a portable and small device, such as drones, cannot afford to accommodate an enlarged array antenna.

Several methods may be considered to reduce the distance between array elements while sustaining low mutual coupling with, e.g., the usage of electromagnetic bandgap (EBG), defected ground structure (DGS), and metamaterials, which helps reduce surface wave and near-field electromagnetic coupling. The size reduction and bandwidth increase may be achieved with an EBG structure. However, the multilayer architecture with embedded vias in the substrate has added fabrication complexity. The mutual coupling reduction may be achieved with DGS, which offers an advantage of easy fabrication compared to the EBG approach. However, because of the back radiation of DGS, the antenna efficiency is significantly degraded. Metamaterials may be inserted between patches to reduce mutual coupling, which needs design optimization.

As disclosed here, narrow and long meander-line (ML) slot resonators can be inserted between and underneath the patches to suppress the mutual coupling between the neighboring patch elements, e.g., in a 2×2 array antenna. The controllability of the resonant frequency for the ML slot resonators is presented by changing their dimensional parameters. Resonant frequency mismatch can be mitigated by designing the array antenna symmetrically. Full 3D structure simulation has been performed using a high frequency structure simulator (HFSS, ANSYS Inc.) and compared with the performance of fabricated structures.

Mutual Coupling Between Patches

Referring to FIG. 1, shown are top and cross-sectional views of an example of a 2×2 patch array antenna which was designed on a printed circuit board (PCB, Rogers 4350B) with a dielectric constant of 3.48 and a loss tangent of 0.0037. Coaxial feeding through the substrate was used. The feeding location is on the diagonal line of each patch for optimal performance of a square shape patch. The geometrical parameters include, e.g., $w_1=l_1=63$ mm, $w_2=l_2=15.1$ mm, d=2 mm, p=1.8 mm, and $h_1=1.52$ mm.

Figure 2:
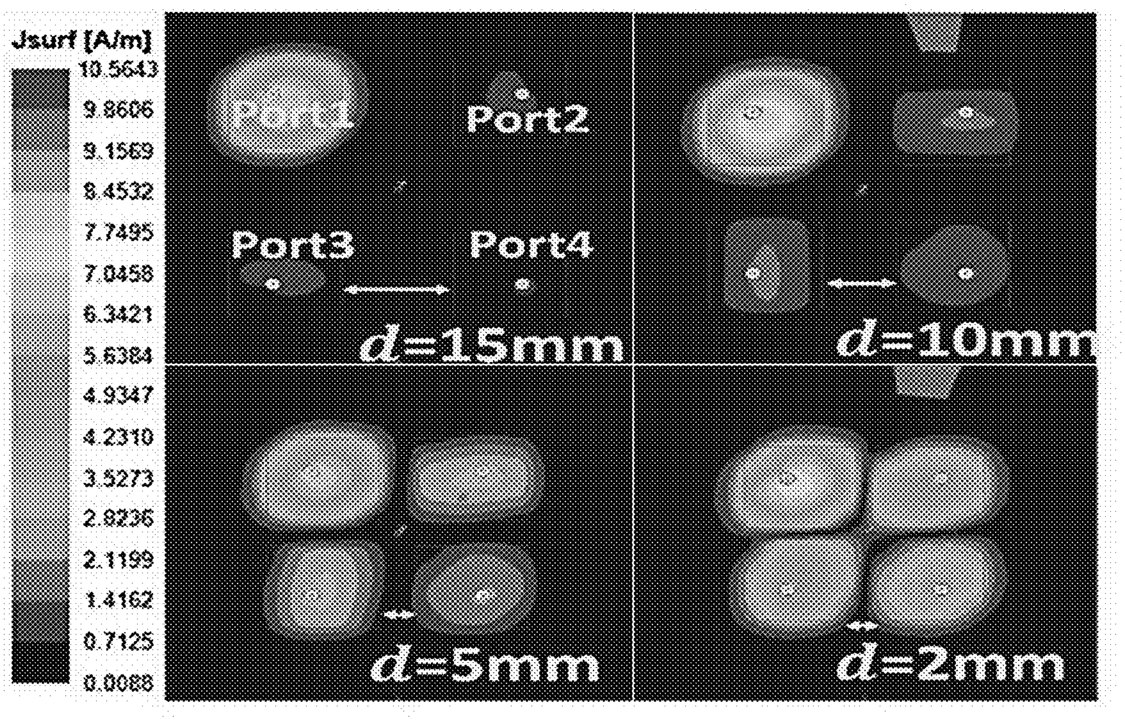
FIG. 2 illustrates an example of the electric current distribution on the patch of FIG. 1 with varying distance between neighboring patch elements, in accordance with various embodiments of the present disclosure.

FIG. 2 shows an example of the electric current distribution on the patch where the distance between neighboring patch elements is 15 mm (top left), 10 mm (top right), 5 mm (bottom left), and 2 mm (bottom right), and port 1 is excited with 1 V and the other ports 2,3,4 are terminated with 50 ohms. As mutual coupling is dependent on the distance between the patches, the most mutual coupling among the four cases can be seen at the distance of 2 mm.

Figures 3, 4:
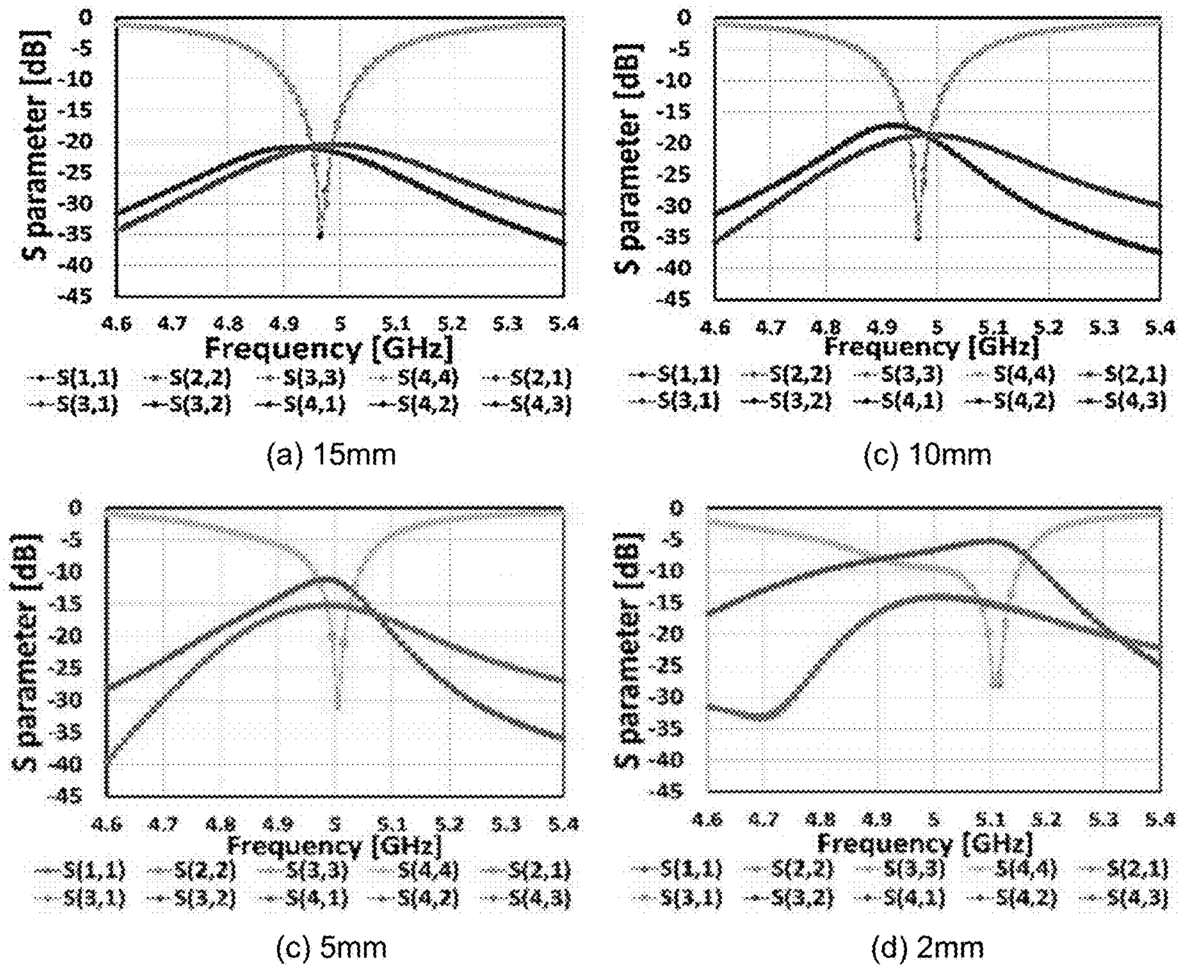
FIG. 3 illustrates an example of the S parameters of the 2×2 patch array antennas, in accordance with various embodiments of the present disclosure.
FIG. 4 is a table illustrating a comparison of insertion loss, in accordance with various embodiments of the present disclosure.

FIG. 3 shows an example of the S parameters of the 2×2 patch array antennas with various distances between the patch elements (a) 15 mm, (b) 10 mm, (c) 5 mm, and (d) 2 mm. All the insertion losses from S21 to S43 are plotted, where the most severe mutual coupling occurs for S41 and S32 of the antenna with 2 mm patch distance as shown in the table of FIG. 4. In addition, the resonant frequency of the antenna elements is greatly shifted, which may be attributed to the increased mutual coupling between the neighboring patches.

Antenna Design

Meander-Line Slot Design. Meander-line (ML) slot resonator structures can offer a compact band-stop function where the prolonged length and the narrowly placed gap (e.g., less than 200 μm) between slot lines increase effective inductance and capacitance, realizing low frequency resonances. With the advantages of size reduction and band-stop function, ML slot resonators can be used for decoupling between the neighboring patches in an array antenna.

Figure 5:
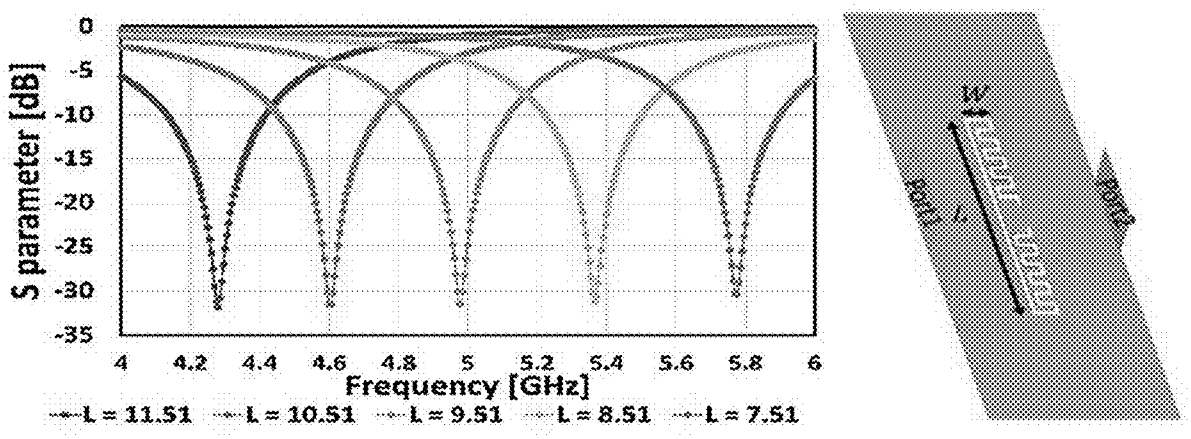
FIG. 5 illustrates an example of the insertion loss (S21) of the ML slot unit cell as length changes, in accordance with various embodiments of the present disclosure.

FIG. 5 shows an example of the insertion loss (S21) of the ML slot unit cell which was simulated on the microstrip when the length of the ML slot changes from 7.51 mm to 11.51 mm. The longer the ML slot is, the more inductance value and so the lower resonant frequency it has as shown in FIG. 5. For the same reason, the resonance frequency decreases as the width of ML slots increases. The target resonant frequency can be obtained by changing one or more dimensions of the ML slot.

Figure 6A:
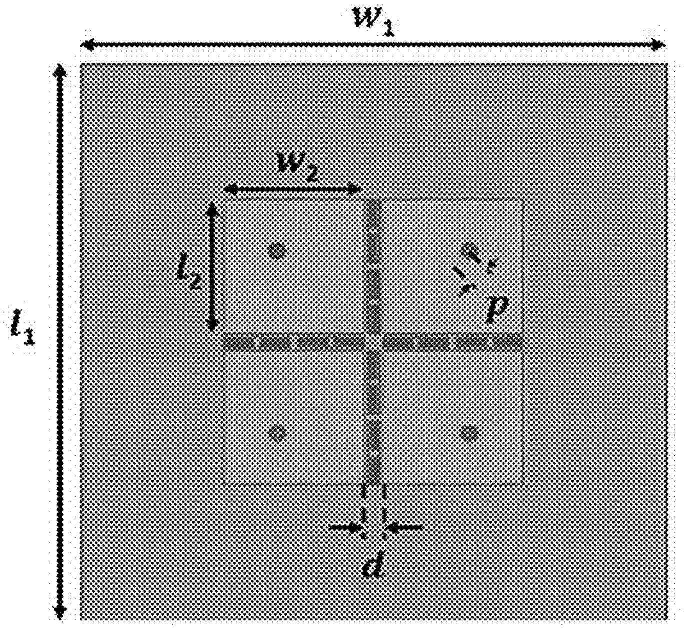
FIGS. 6A and 6B illustrate an example of a 2×2 patch array antenna with 4 pairs of ML slots inserted between the patch elements, in accordance with various embodiments of the present disclosure.
Figure 6B:
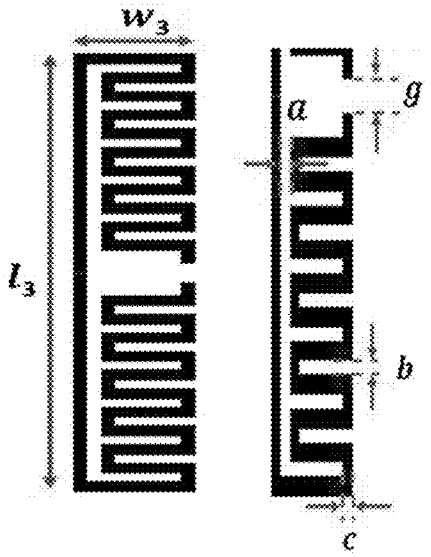

ML Placement in Parallel with the Sides of Square Patches: Design (1). FIG. 6A shows a top view of an example of a designed 2×2 patch array antenna with 4 pairs of ML slots inserted between the patch elements (ML slots on the ground) to suppress their mutual coupling and FIG. 6B shows the magnified ML slot. The geometrical parameters include, e.g., $w_3$=1.39 mm, $l_3$=7.16 mm, a=0.16 mm, b=0.1 mm, c=0.16 mm, d=2 mm, g=0.25 mm, and p=1.8 mm. The antenna was designed on the same PCB with the same dimensional parameters shown in FIG. 1. In addition, the feeding location of each patch is on the diagonal axis of each patch to achieve its symmetric design.

FIG. 7A shows an example of the current distribution of the patch array antenna with ML slots on the ground plane between the patches in a parallel direction with the square patches when the only port 1 is excited and other ports are terminated with 50 ohms. There is less current concentration on port 4 when compared to FIG. 2, while ports 2 and 3 still have some current distribution shown. FIG. 7B shows the return loss and insertion loss of the patch array antenna. The insertion loss between diagonally located patches (e.g., −|S14| and −|S23|) shows a mutual coupling reduction of 17.54 dB and 17.59 dB, whereas the insertion loss between laterally and vertically located patches has little mutual coupling enhancement as shown in the table of FIG. 8.

Figure 9A:
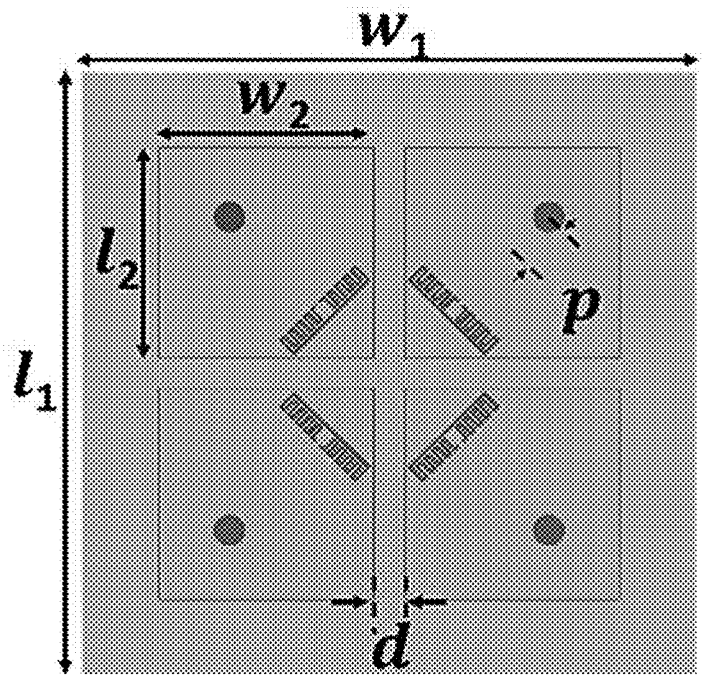
FIGS. 9A and 9B illustrate an example of a 2×2 patch array antenna with diagonally placed ML slots.
Figure 9B:
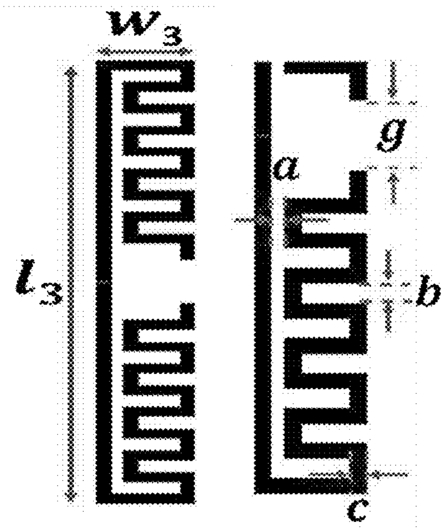
Figure 9C:
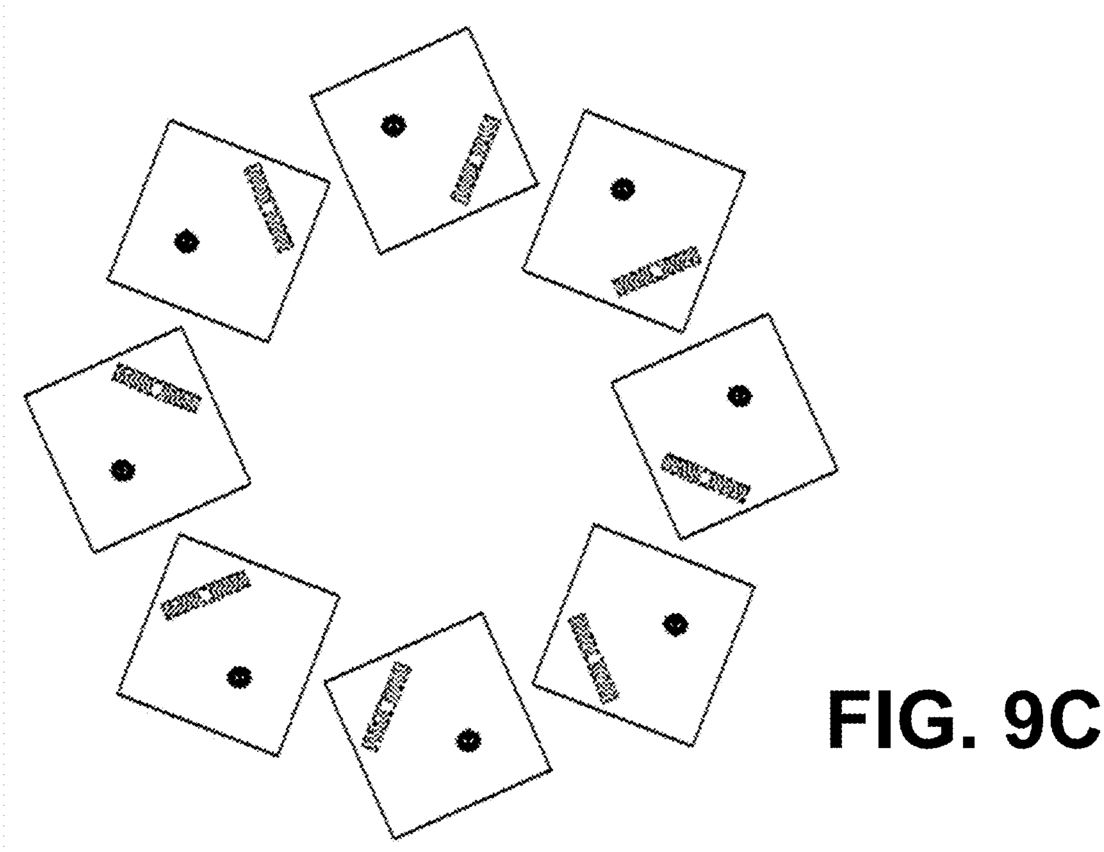
FIG. 9C illustrates an example of patch antenna elements arranged in a circular array.

ML Placement in Diagonal to the Sides of Square Patches: Design (2). FIG. 9A shows a top view of an example of a 2×2 patch array antenna with diagonally placed ML slots on the ground plane underneath the patches and FIG. 9B shows the magnified ML slot. The antenna was designed on a PCB (FR4) with a dielectric constant of 4.4 and a loss tangent of 0.02. With the higher electrical permittivity of the substrate and the different target frequency, the patch size was increased to 20 mm×20 mm. The geometrical parameters include, e.g., $w_1$=$l_1$=60 mm, $w_2$=$l_2$=20 mm, d=2 mm, p=3.5 mm, $w_3$=1.8 mm, $l_3$=10 mm, a=0.21 mm, b=0.26 mm, c=0.26 mm, d=2 mm, and g=0.53 mm. Additionally, the diameter of the ML unit was also optimized to resonate as the band-stop filter at the target frequency of 3.5 GHz. FIG. 9C shows a plurality of patch antenna elements arranged in a circular array. The plurality of patch antenna elements can be uniformly distributed about the circular array as shown. The plurality of patch antenna elements can comprise five or more patch antenna elements or can consist of 8 patch antenna elements as illustrated. FIG. 9D shows an example of a patch antenna element with two ML slots formed in a ground plane opposite the patch antenna element with a first ML slot extending at an angle between first and second sides of the patch antenna element, the first and second sides defining a first corner of the patch antenna element, and a second ML slot at an angle between the second side and a third side of the corresponding patch antenna element, the second and third sides defining a second corner of the corresponding patch antenna element.

FIG. 10A shows an example of the current distribution of the patch array with diagonally placed 4 ML slots, where port 1 is excited and ports 2, 3, and 4 are terminated with 50 ohms. The current from port 1 was effectively blocked by the ML slots while showing the current concentration near the ML slots. FIG. 10B shows the simulated S parameters and the insertion loss of S21 through S43 is overall enhanced. The simulated S parameter results can be seen in the table of FIG. 8.

Antenna Performance Comparison

Figure 11A:
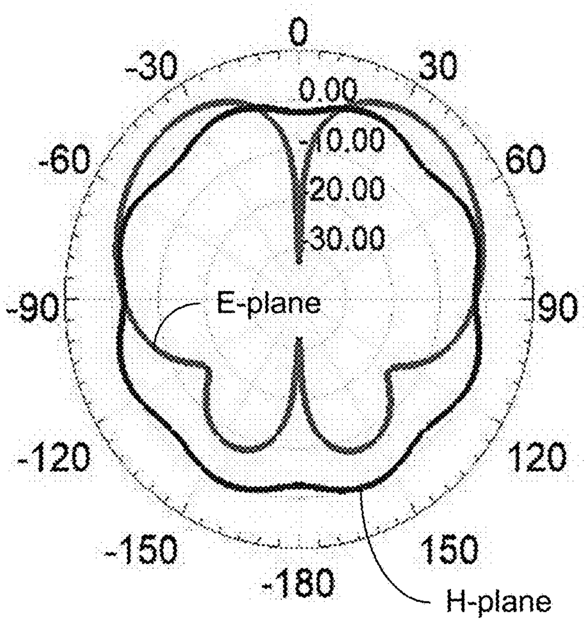
FIGS. 11A-11B and 12A-12B illustrate examples of the radiation pattern of antenna designs (1) and (2), without ML slots and with ML slots, in accordance with various embodiments of the present disclosure.
Figure 11B:
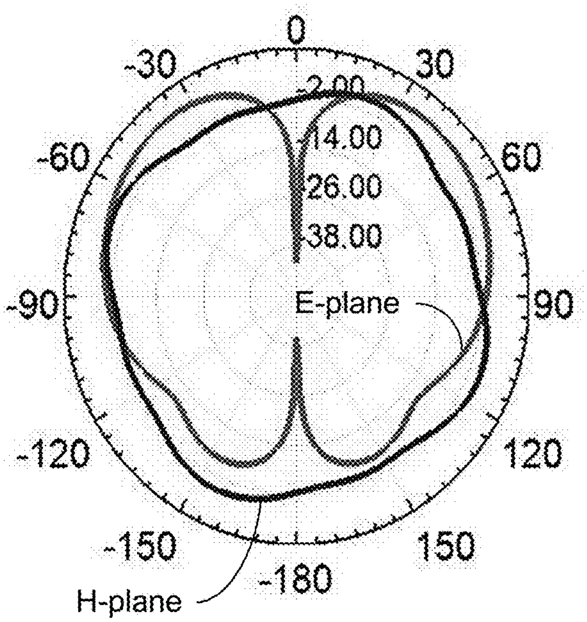
Figure 12A:
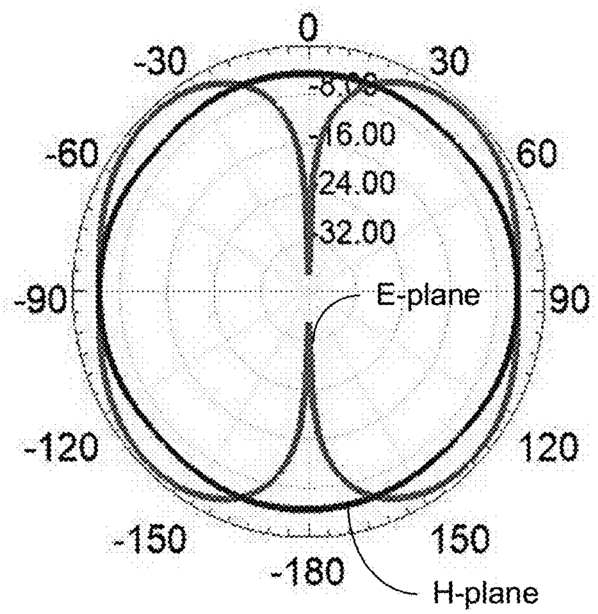
Figure 12B:
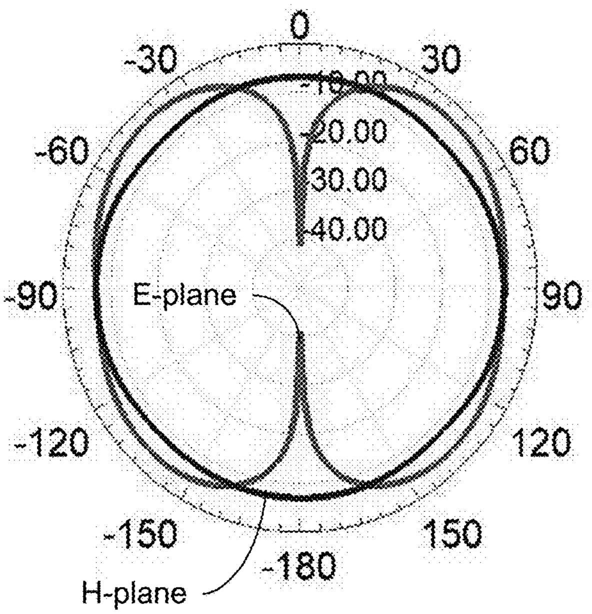

FIGS. 11A and 11B show examples of the radiation pattern of antenna design (1) without ML slots and with ML slots, respectively. FIGS. 12A and 12B show examples of the radiation pattern of antenna design (2) without ML slots and with ML slots, respectively. The radiation patterns of each antenna design were determined where all ports were excited with the same voltage and phase. The overall radiation pattern of each antenna design has little difference between with/without ML slots, but the gain was slightly degraded because of the back radiation of ML slots etched from the ground plane. The radiation pattern of antenna design (2) shows the similarity to the radiation pattern of the dipole antenna which has an omni-directional radiation pattern. This is because the antenna design (2) was configured to be perfectly symmetric from the center position while balancing the radiation between the adjacent patch antenna elements.

To compare the antenna performance, the radiation efficiency and antenna gain can be used to represent how the antenna works properly. In the table of FIG. 13, the FR-4 which has a dielectric constant of 4.4 and a loss tangent of 0.02, and Rogers 4350B which has a dielectric constant of 3.48 and a loss tangent of 0.0037 were used to compare the radiation efficiency and peak gain of each antenna design. The antenna on the FR-4 substrate which has a high loss property shows a low radiation efficiency and peak gain than the antenna on Rogers 4350B while showing a big gap especially in design (2). Furthermore, the radiation efficiency and peak gain decrease when the ML slots are inserted on the ground plane.

Figure 15A:
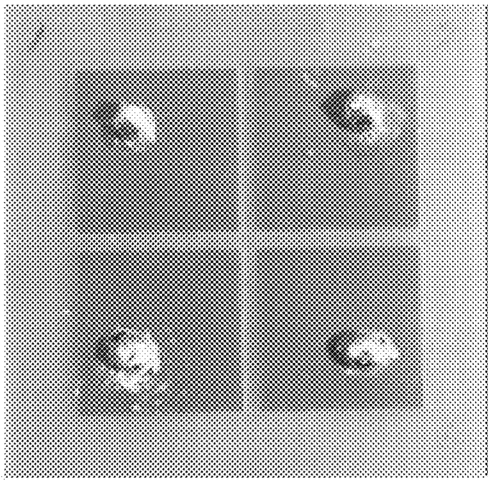
Figure 15B:
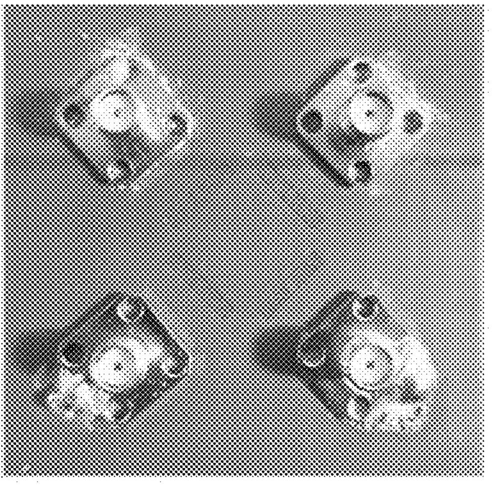
Figure 15C:
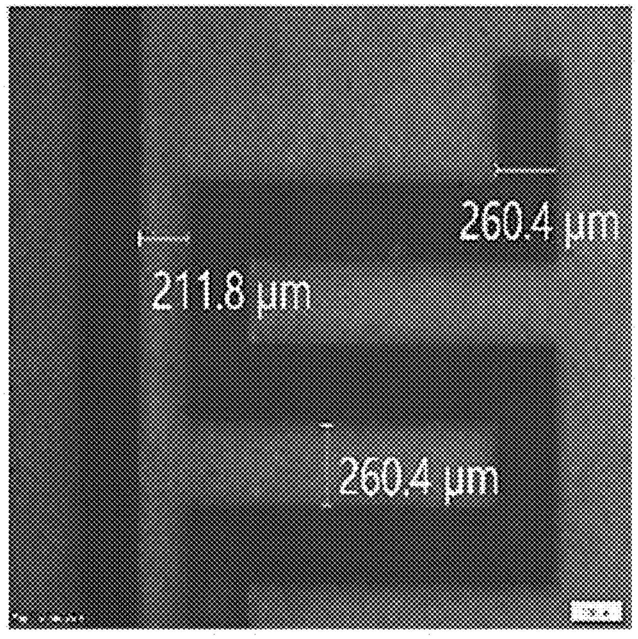

FIGS. 14A-140 and 15A-15C are images showing fabricated 2×2 patch arrays with ML slots inserted between the patches (design (1)) and underneath the patches (design (2)), respectively. FIGS. 14A and 15A show a top view of the 2×2 patch array antennas and FIGS. 14B and 15B show a bottom view of the patterned ML slots with coaxial feeding connectors mounted. A milling machine was used to cut off the patch on top of the substrate and photolithography was used to pattern the compact size of ML slots on the ground plane. FIG. 14C shows the patterned photoresist before etching and FIG. 15C shows the magnified ML slot after etching.

Figure 16A:
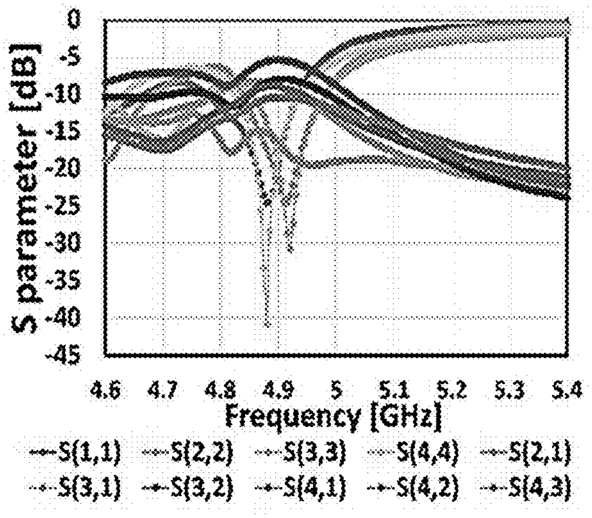
FIGS. 16A-16B and 17A-17B illustrate examples of measured S parameters of antenna designs (1) and (2), without ML slots and with ML slots, in accordance with various embodiments of the present disclosure.
Figure 16B:
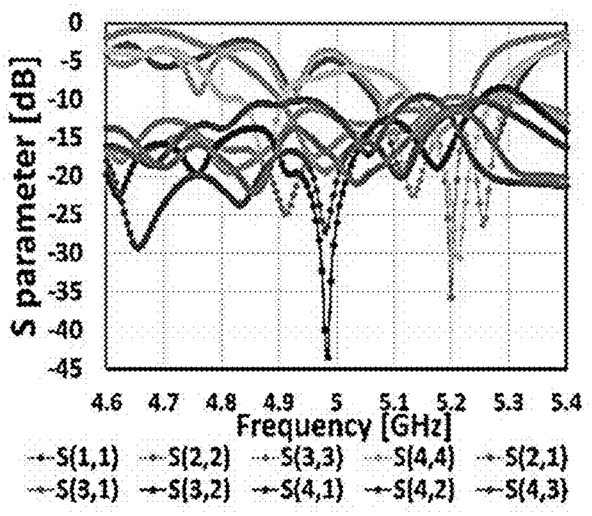

A Vector Network Analyzer (VNA) was used to characterize the S parameters of the fabricated antennas. FIGS. 16A and 16B show examples of the measured S parameters of antenna design (1) without ML slots and with ML slots, respectively. The overall mutual coupling was severe for the one without ML slots, especially when the insertion loss of S41 and S32 degrades to 5 dB and 8 dB at the resonant frequency. However, the overall mutual coupling was alleviated after the ML slots were inserted, while showing that every insertion loss was below 10 dB between 4.8 GHz and 5.2 GHz and the insertion loss for S41 and S32 was enhanced to 27 dB and 43 dB, respectively, at the initial target frequency of 4.99 GHz. However, the small dimension for the ML slots (about 0.1 mm) is within an error range for the fabrication in the lab (about 100 μm), and as a result, the measured parameters were mismatched with the simulated parameters.

Figure 17A:
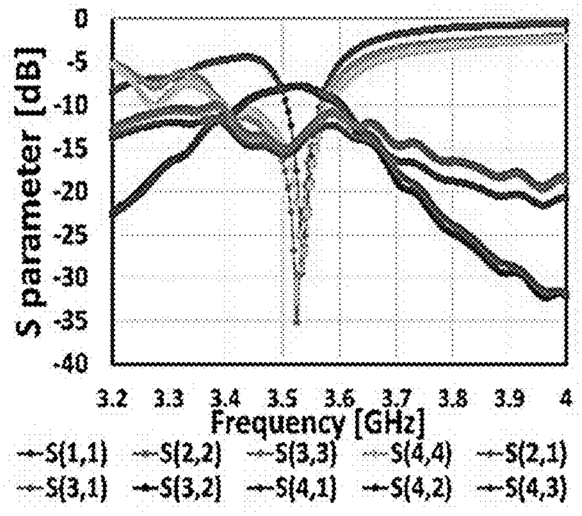
Figure 17B:
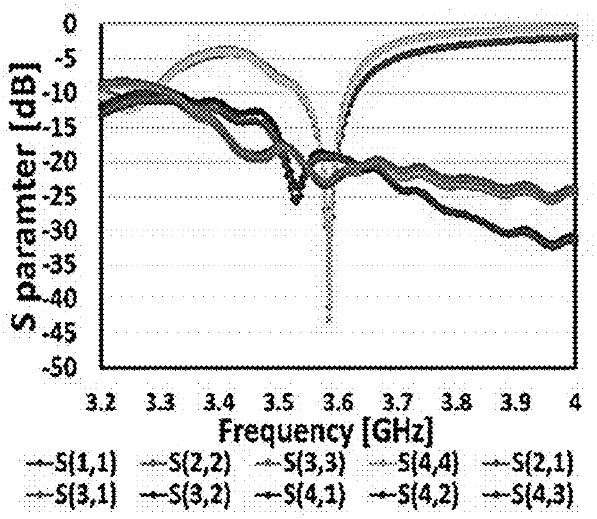

FIGS. 17A and 17B show examples of the measured S parameter of antenna design (2) without ML slots and with ML slots, respectively. The more simplified ML slots design on the ground plane compared to antenna design (1) produces a good result in decreasing the fabrication tolerance where fabrication is outsourced by an external vendor for better fabrication tolerance. The measured S parameters show good matching between simulated and measured S parameters. The comparison of measured S parameters is shown in the table of FIG. 18.

Highly compact 2×2 patch array antennas with ML slots have been designed, fabricated, and characterized for the reduction of the mutual coupling between neighboring antenna patches. ML slots placements between the patches in parallel with the patch and underneath the patches in a diagonal direction are studied. Both designs show mutual coupling reduction. The former antenna design shows mutual coupling reduction up to 10.81 dB between diagonally placed patches (S14 and S23), while the second antenna design shows mutual coupling reduction for all antenna elements evenly. The former one fabricated in the lab shows a relatively large deviation from the design due to fabrication tolerance while the latter one fabricated by a commercial vendor shows good matching with the designed performance. This mutual coupling reduction architecture will help reduce the array antenna size while possessing EMI immunity to an intentional or unintentional external interference. The table of FIG. 19 illustrate a comparison of the two designs to other state-of-the-art antennas.

Highly Compact Array MIMO Module for EMI Immune Communications

Figures 20, 21:
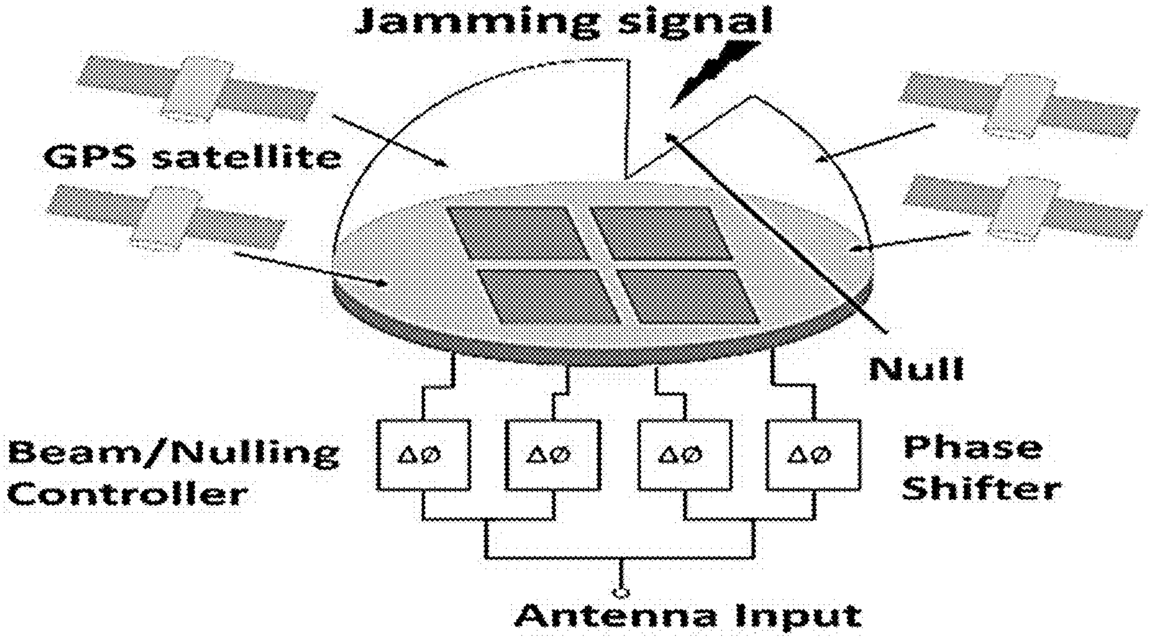
FIG. 20 illustrates an example of electromagnetic interference (EMI) of a global positioning system (GPS) drone, in accordance with various embodiments of the present disclosure.
FIG. 21 is a table illustrating an example of dimensional parameters of the resonators and patches, in accordance with various embodiments of the present disclosure.

Multiple-input and multiple-output (MIMO) antenna systems have been drawing great attention for a hardware security feature such as an anti-jamming signal function and high electromagnetic interference (EMI) immunity for both defense systems (e.g., anti-jamming radars and satellite communications) and civilian applications (e.g., IoT drones and unmanned vehicles). Drones usually employ a single patch antenna for global positioning system (GPS) communications while such a single patch is highly susceptible to intentional or unintentional external interference. For example, GPS is vulnerable to EMI as the system frequency is close to other bands such as ones for TCAS (Traffic Alert Collison & Avoidance System) and IFF (Identification Friend or Foe). Although sufficiently separated frequency bands are used to reduce EMI, it has become difficult to exclude EMI only with the frequency separation as multiple communication equipment is placed in the near proximity of drones. Therefore, there is a need to accommodate multiple antenna resonances to null out unnecessary interference from external signals as shown in FIG. 20.

An array, however, occupies a larger footprint, which negatively impacts on small portable and mobile applications. The size of an array antenna is mainly dictated by the distance between the elements with generally a half-wavelength or larger (>$\lambda_0/2$), by which the mutual coupling between array elements can be mitigated. There are efforts to decrease the distance between array elements without increasing mutual coupling between elements and performance degradation. Cross talk reduction between array elements may be accomplished by placing various decoupling structures between antenna elements.

Different from other approaches, a unique decoupling architecture is presented to suppress mutual coupling. Narrow and slim ring resonator structures can be diagonally placed underneath patch elements, enabling further reduction of the gap between array elements while the mutual coupling between array elements can be greatly suppressed and antenna radiation performance preserved.

Design of Decoupling Structure and Array

FIG. 9A shows an example of a 2×2 patch array antenna with diagonally placed 4 meander-line (ML) slots. The structure was designed on a printing circuit board (PCB, FR-4) with a dielectric constant of 4.4 and a loss tangent of 0.02. The distance between patches is 2 mm ($0.033\lambda_0$) which is much smaller than that of a conventional patch array with a typical separation of $0.5\lambda_0$. This architecture places the feeding point of each patch on the diagonal axis of the patch to realize a symmetric design. The symmetric design of the array antenna provides good impedance matching capability than other architectures. This architecture enables to suppress EMI from other communication equipment using neighboring frequency bands.

The ML slot can be designed to operate as a band-stop filter that blocks the surface wave currents, thereby providing isolation improvement between the patch elements at the operating frequency. The ML slots can be etched from the ground plane. The compact design of the ML slots can be realized by accommodating multi-turn meander slots. Each design parameter of the ML slots can be carefully optimized to have a compact size of ML slots while maintaining radiation resonance at a target frequency. The detailed dimensions of the ML slots are shown in FIG. 9B. The table of FIG. 21 illustrates the dimensional parameters of the resonators and patches. The simulated insertion loss (S21) of the ML slot unit cell according to the number of folded ML slots is shown in FIG. 22, with the insert illustrating how to calculate the parameter N. An insertion loss of more than 25 dB has been achieved at 5 GHz with good isolation. It was observed that the overall size of the ML slot can be reduced as the number of turns is increased. Full 3D structure simulation can be performed by using a high frequency structure simulator (HFSS, ANSYS Inc.).

FIG. 23 shows an example of the current distribution and current flow of the 2×2 patch array with ML slots (bottom plots) and without the ML slots (top plots) where port 1 is excited and port 2, 3, 4 are terminated with 50 ohms. From port 1, high concentration of the surface currents appears on the port 2, 3, 4 without ML slots due to the strong mutual coupling (top left and right plots). On the other hand, less current concentration has been observed on the other port with ML slots, while high current distribution is shown on the ML slots which indicates the surface current flow is blocked by ML slots between patches. The simulated current distribution and current flow results show that isolation improvement can be achieved by inserting the ML slots under the patches.

FIGS. 24A and 24B show examples of the return loss and insertion loss without/with ML slots. Since the patches were designed symmetrically, there was no resonant frequency mismatching between patches. The test results are summarized in the table of FIG. 24C, where the enhancement of mutual coupling reduction for the one with ML compared with the one without ML is between 11.11 dB and 13.26 dB.

Figure 25A:
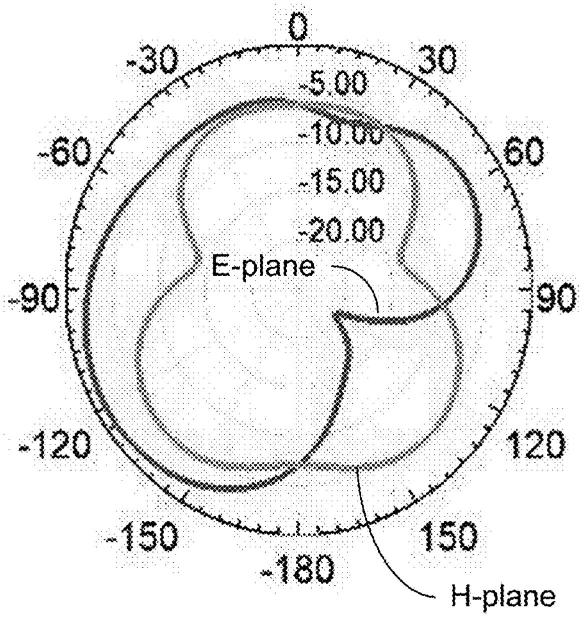
FIGS. 25A-25D illustrate examples of radiation patterns of E-plane and H-plane for four cases, in accordance with various embodiments of the present disclosure.
Figure 25B:
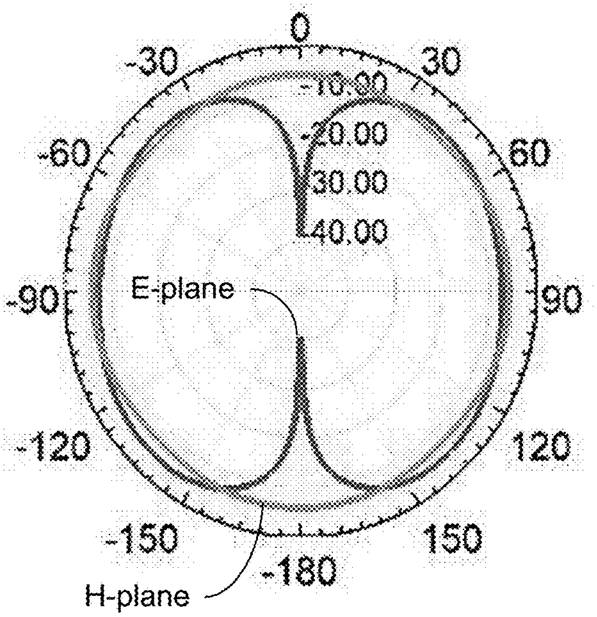
Figure 25C:
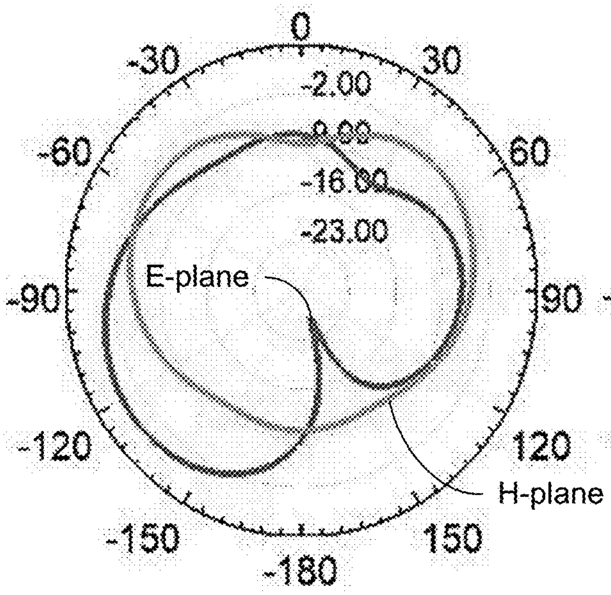
Figure 25D:
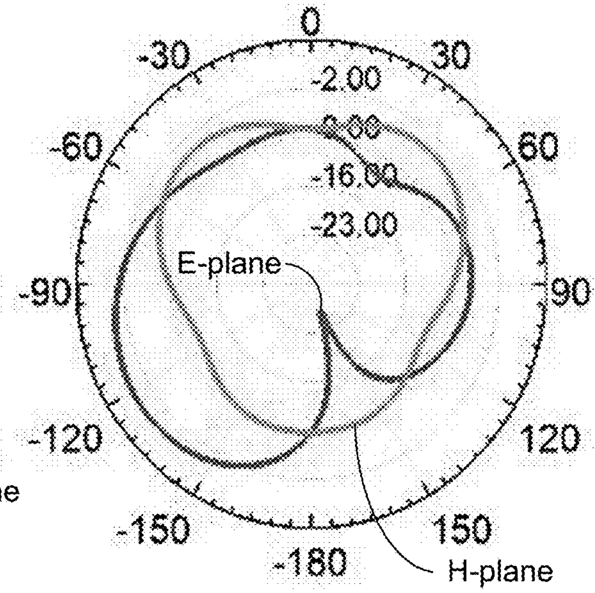

FIGS. 25A-25C represent examples of the E/H-plane radiation patterns of the antenna according to four different operating cases from case 1 to 4. The table of FIG. 25E illustrates the classification of the four cases. The radiation pattern can be controlled by changing the amplitude and phase of each power source. Especially, case 2 shows the omni-directional radiation pattern like dipole antenna which has the nulls to the vertical direction (0°, 180° in E-Plane) when the amplitude and phase are all the same. The table of FIG. 25F shows the antenna performance case by case, while showing the best performance for case 4.

Fabrication

FIGS. 26A-26C are images showing a fabricated 2×2 patch array with ML slots. FIG. 26A is a top view and FIG. 26B is a bottom view with the ML slots. A milling machine was used to cut the patch on top of the substrate and photolithography is used to pattern the narrow ML slots on the ground plane. FIG. 26C shows an etched ML slot, which is magnified, whose dimension is very close to the designed specification.

Measurement Results

Figure 27A:
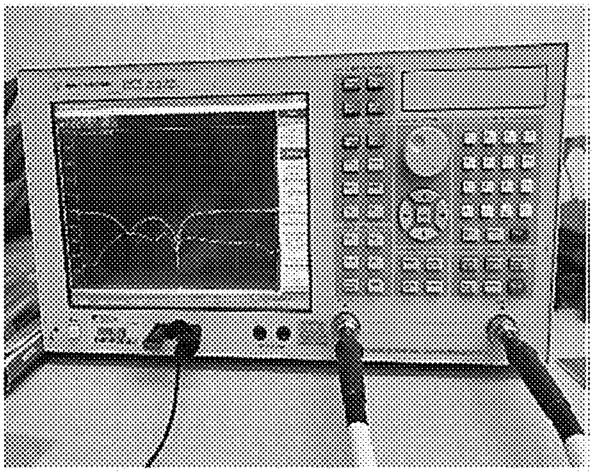
FIGS. 27A and 27B are images illustrating an example of antenna measurements with a vector network analyzer connected to a 2×2 patch array, in accordance with various embodiments of the present disclosure.
Figure 27B:
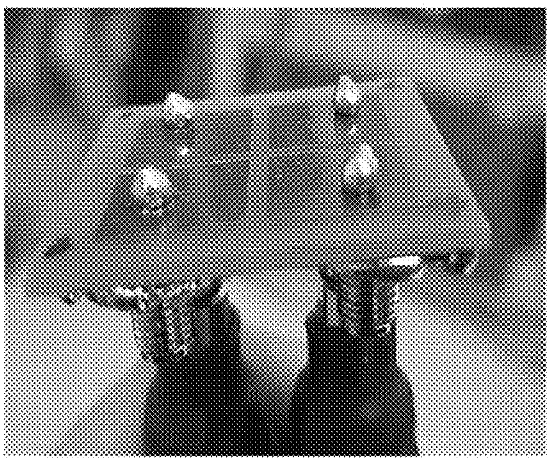
Figure 28A:
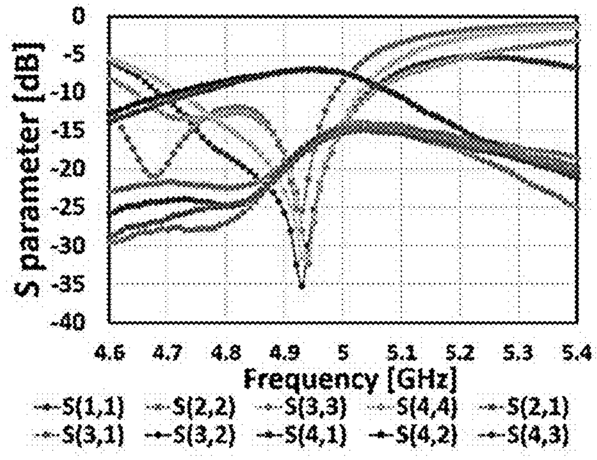
FIGS. 28A and 28B illustrate examples of measured S parameters without ML slots and with ML slots, in accordance with various embodiments of the present disclosure.
Figure 28B:
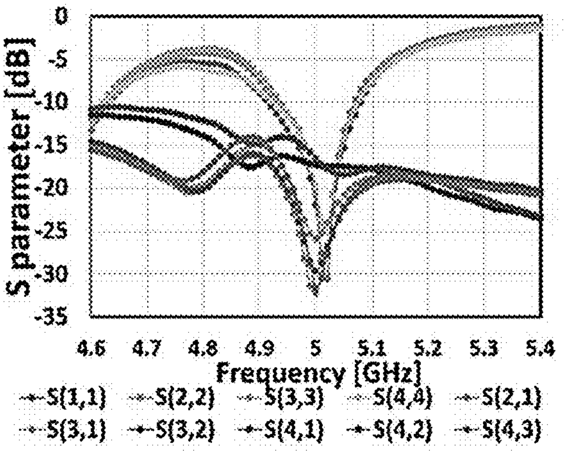

FIGS. 27A and 27B show photographs of antenna measurements with the vector network analyzer (VNA) of FIG. 27A connected to a fabricated 2×2 patch array of FIG. 27B. FIGS. 28A and 28B show examples of the measured S parameter of the 2×2 patch arrays without ML slots and with ML slots, respectively. With ML slots diagonally placed under the patches, the entire insertion loss was enhanced at the target frequency, as shown in the table of FIG. 28C. The measured results show good matching with the simulation results shown in FIGS. 24A and 24B. There is no mismatching resonant frequency between fabricated patches because of the symmetric design, but the overall 10 dB bandwidth of resonant antennas decreased due to back radiation from ML structures.

High isolation between antenna elements can be realized by inserting a diagonally placed meander-line ring resonator on the ground plane under each patch, which maintains well MIMO antenna performance. Furthermore, the radiation pattern can be reshaped to produce nulls against EMI and jamming signals by controlling the amplitude and the phase of the power source. The symmetric design of the MIMO antenna module can mitigate the impedance mismatching of the radiation resonance frequency. From this work, the most compact MIMO antenna module with EMI immunity has been demonstrated. Both milling machine and microfabrication processes were used. Performance comparison of the demonstrated antenna module with other state-of-the-art 2×2 array antennas shows no degradation of radiation or controlled beam capability. The table of FIG. 29 illustrates a comparison of the antenna design to other state-of-the-art antennas.

This disclosure has presented a meander-line (ML) slot resonator inserted on the ground plane to reduce the mutual coupling between closely placed array patches in a 2×2 array antenna for 5 GHz WLAN and 3.5 GHz Citizens Broadband Radio Service (CBRS) applications. The distance between the patch elements is 2 mm (i.e. $0.033\lambda_0$) for 5 GHz and ($0.023\lambda_0$) for 3.5 GHz. The dimensions of the ML slot unit cell can be optimized to operate as a band-stop filter at the target frequency. Two types of ML placements were demonstrated: (1) one has the ML slots parallelly placed between the patch elements and (2) the other has the ML slots diagonally placed underneath each patch. Both designs are point symmetric at the center of the 2×2 array. More than 55% area reduction has been achieved compared with conventional 2×2 array elements. A mutual coupling reduction of at least 9 dB has been achieved for all the antenna elements with the diagonal ML slot architecture.

A highly compact MIMO array antenna module with electromagnetic interference (EMI) immune capability was also designed, implemented, and characterized for secure 5 GHz Wi-Fi applications. The size of the array antenna is greatly reduced by shrinking the gap between array elements to 2 mm ($0.033\lambda_0$). The mutual coupling between array elements can be effectively suppressed by adding diagonally placed meander-line (ML) ring resonators under each element without degrading antenna gain and directivity performance. Compared with a conventional 2×2 array antenna module, the demonstrated 2×2 shows a 65% area reduction. The resonant frequency of the fabricated structure matches well with the target frequency. The feeding locations of the patch elements can be optimized for a symmetric design. A mutual coupling reduction of more than 13 dB was demonstrated.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. An antenna array, comprising:

a plurality of patch antenna elements disposed on a first side of a substrate; and a plurality of meander line (ML) slots formed in a ground plane disposed on a second side of the substrate, each of the plurality of ML slots disposed opposite a corresponding patch antenna element of the plurality of patch antenna elements with the ML slot extending at an angle between first and second sides of the corresponding patch antenna element, the first and second sides extending from a corner of the corresponding patch antenna element that is adjacent to at least one adjacent patch antenna element of the plurality of patch antenna elements, where the ML slot does not extend beyond the first and second sides of the corresponding patch antenna element and a feeding connection to the corresponding patch antenna element is offset from a center of the corresponding patch antenna element opposite the ML slot, the feeding connection extending through the substrate.

2. The antenna array of claim 1, wherein the plurality of patch antenna elements are arranged in a rectangular array, the first side adjacent to a first adjacent patch antenna element and the second side adjacent to a second adjacent patch antenna element.

3. The antenna array of claim 2, wherein the plurality of patch antenna elements consists of four patch antenna elements.

4. The antenna array of claim 2, wherein a gap distance between the corresponding patch antenna element and each of the first and second adjacent patch antenna elements is less than 0.1λ, where λ is a guided wavelength of an excitation frequency of the antenna array.

5. The antenna array of claim 4, wherein the gap distance is less than 0.05λ.

6. The antenna array of claim 1, wherein the ML slot extends at an angle of about 45 degrees with respect to the first and second sides of the corresponding patch antenna element.

7. The antenna array of claim 1, wherein the ML slot comprises two multiply folded sections extending from opposite ends of the ML slot towards a center point of the ML slot with the opposite ends of the two multiply folded sections connected by a linear section extending between the opposite ends of the ML slot, wherein distal ends of the two multiply folded sections are separated by a fixed distance.

8. The antenna array of claim 1, wherein the plurality of patch antenna elements are arranged in a circular array, the corner defined by the first and second sides adjacent to a side of an adjacent patch antenna element.

9. The antenna array of claim 8, wherein the ML slot opposite the corresponding patch antenna element is substantially parallel to the side of the adjacent patch antenna element.

10. The antenna array of claim 8, wherein the plurality of patch antenna elements are uniformly distributed about the circular array.

11. The antenna array of claim 8, wherein the plurality of patch antenna elements comprises five or more patch antenna elements.

12. The antenna array of claim 11, wherein the plurality of antenna elements consists of 8 patch antenna elements.

13. An antenna array, comprising:

a plurality of patch antenna elements disposed on a first side of a substrate; and a plurality of meander line (ML) slots formed in a ground plane disposed on a second side of the substrate, each of the plurality of ML slots disposed opposite a corresponding patch antenna element of the plurality of patch antenna elements with the ML slot extending at an angle between first and second sides of the corresponding patch antenna element, the first and second sides extending from a corner of the corresponding patch antenna element that is adjacent to at least one adjacent patch antenna element of the plurality of patch antenna elements, wherein a second ML slot is disposed opposite the corresponding patch antenna element with the second ML slot extending at an angle between the second side and a third side of the corresponding patch antenna element, the second and third sides extending from a second corner of the corresponding patch antenna element.

14. The antenna array of claim 13, wherein the plurality of patch antenna elements are arranged in a rectangular array, the first side adjacent to a first adjacent patch antenna element and the second side adjacent to a second adjacent patch antenna element.

15. The antenna array of claim 14, wherein a gap distance between the corresponding patch antenna element and each of the first and second adjacent patch antenna elements is less than 0.1λ, where λ is a guided wavelength of an excitation frequency of the antenna array.

16. The antenna array of claim 15, wherein the gap distance is less than 0.05λ.

17. The antenna array of claim 13, wherein the ML slot extends at an angle of about 45 degrees with respect to the first and second sides of the corresponding patch antenna element.

18. The antenna array of claim 13, wherein the ML slot comprises two multiply folded sections extending from opposite ends of the ML slot towards a center point of the ML slot with the opposite ends of the two multiply folded sections connected by a linear section extending between the opposite ends of the ML slot, wherein distal ends of the two multiply folded sections are separated by a fixed distance.

19. The antenna array of claim 13, wherein the plurality of patch antenna elements are arranged in a circular array, the corner defined by the first and second sides adjacent to a side of an adjacent patch antenna element.

20. The antenna array of claim 19, wherein the plurality of patch antenna elements are uniformly distributed about the circular array.

* * * * *